US006931446B1

(12) United States Patent
Cox et al.

(10) Patent No.: US 6,931,446 B1
(45) Date of Patent: Aug. 16, 2005

(54) METHODS, SYSTEMS AND COMPUTER PROGRAM PRODUCTS FOR POLICY BASED NETWORK CONTROL OF CHARACTERISTICS OF USER SESSIONS

(75) Inventors: David E. Cox, Raleigh, NC (US); James Corvin Fletcher, Apex, NC (US); David Bruce Lindquist, Raleigh, NC (US); Carl S. Kessler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 09/211,527

(22) Filed: Dec. 14, 1998

(51) Int. Cl.[7] ............................................. G06F 15/173
(52) U.S. Cl. ..................................... 709/227; 709/208
(58) Field of Search ............................... 709/227–228, 709/203, 208; 707/10

(56) References Cited

U.S. PATENT DOCUMENTS

| | | | |
|---|---|---|---|
| 4,586,134 A | * | 4/1986 | Norstedt |
| 5,553,242 A | * | 9/1996 | Russell et al. ............... 709/227 |
| 5,615,339 A | * | 3/1997 | Ban ........................... 709/227 |
| 5,835,726 A | * | 11/1998 | Shwed et al. ............... 709/229 |
| 5,889,958 A | * | 3/1999 | Willens ....................... 709/229 |
| 5,913,040 A | * | 6/1999 | Rakavy et al. |
| 5,987,611 A | * | 11/1999 | Freund ....................... 713/201 |

(Continued)

OTHER PUBLICATIONS http://nf/pdc97/profiles_and_policies.htm "Guide to Microsoft Windows NT 4.0 Profiles and Policies" pp. 1-76.
http://www/ietf.org/htlm.charters/acap-charter.html "Application Configuration Access Protocol (acap)," 68 pages.
IBM Network Station Manager for Windows NT Server 4.0, Chapter 5. Using the IBM Network Station Manager, pp. 5-1 to 5-15.
http://www.software.ibm.com/os/warp/library/sq202822.htm, "WorkSpace on-Demand Handbook," Chapters 2.3.1; 6.2; 6.3; 6.3.1; 6.3.3; 6.5.
http://www.triteal.com/SoftNC, Java Desktop Environment from Triteal, pp. 1-2.
http://java.sun.com/products/hot-javaviews/admin.html, "Hotlava Views," pp. 1-24.
http://esuite.lotus.com/eSuite/eSuite, "The Right Work Environment for Network Centric Computing," 24 pages.
TR05 Babelfish: Real-Time Machine Translation on the Internet, website:www.tc-forum.org/topictr/tr06babe.htm. May, 1998.

*Primary Examiner*—Bunjob Jaroenchonwanit
(74) *Attorney, Agent, or Firm*—Myers Bigel Sibley & Sajovec

(57) ABSTRACT

Methods, systems and computer program products are provided for controlling a user session in a network by defining rules for controlling user sessions based on characteristics of an operating environment, determining the characteristics of an instance of an operating environment associated with a user session in the network and applying the defined rules to the determined characteristics to control the user session based on the characteristics of the instance of the operating environment. In particular, the type of network connection, the type of device connected to the network, the user identification of the user and/or the identification of an application executed by the user may be determined and the session controlled based on this determination. Preferably, the rules control the content of communications provided during the user session based on the characteristics of the operating environment.

24 Claims, 4 Drawing Sheets

U.S. PATENT DOCUMENTS

| | | | |
|---|---|---|---|
| 6,009,459 A | * 12/1999 | Belfiore et al. | 709/203 |
| 6,073,165 A | * 6/2000 | Narasimhan et al. | 709/206 |
| 6,088,805 A | * 7/2000 | Davis et al. | 713/202 |
| 6,108,686 A | * 8/2000 | Williams, Jr. | 709/202 |
| 6,128,655 A | * 10/2000 | Fields et al. | 709/219 |
| 6,185,619 B1 | * 2/2001 | Joffe et al. | 709/229 |
| 6,216,157 B1 | * 4/2001 | Vishwanath et al. | 709/208 |
| 6,351,771 B1 | * 2/2002 | Craddock et al. | 709/227 |

* cited by examiner

METHODS, SYSTEMS AND COMPUTER PROGRAM PRODUCTS FOR POLICY BASED NETWORK CONTROL OF CHARACTERISTICS OF USER SESSIONS

FIELD OF THE INVENTION

The present invention relates to network management in general and in particular to preference management in a network environment.

BACKGROUND OF THE INVENTION

Traditional mainframe computer configurations provided for user interface to the computer through computer terminals which were directly connected by wires to ports of the mainframe computer. As computing technology has evolved, processing power has typically evolved from a central processing center with a number of relatively low-processing power terminals to a distributed environment of networked processors. Examples of this shift in processing include local or wide area computer networks which interconnect individual work stations where each workstation has substantial independent processing capabilities. This shift may be further seen in the popularity of the Internet which interconnects many processors and networks of processors through devices such as, for example, routers. This type of network environment is often referred to as a client-server environment with client stations coupled to and supported by a server station.

In the modern distributed processing computer environment, control over software, such as application programs, is more difficult than where a mainframe operated by an administrator is used, particularly for large organizations with numerous client stations and servers distributed widely geographically and utilized by a large number of users. Furthermore, individual users may move from location to location and need to access the network from different client stations at different times. The networked environment increases the challenges for a network administrator in maintaining proper licenses for existing software and deploying new or updated application programs across the network.

A further complication in network systems is that, typically, these systems include combinations of network applications and native applications as well as combinations of different connection types and hardware devices. As used herein "native applications" refers to applications which are installed locally on a workstation such that characteristics associated with the native application are stored on the workstation. The combinations of network connections, differing hardware, native applications and network applications makes portability of preferences or operating environment characteristics which provide consistency from workstation to workstation difficult. Furthermore, differences in hardware or connections may create inefficiencies as users move from workstation to workstation. For example, a user may, in a first session, access the network utilizing a high speed connection and a workstation with a high resolution color monitor to execute an application and then, in a later session, access the network to execute the same application from a mobile computer with a monochrome display and a low speed modem connection to the network. Thus, session content, such as color display data or preferences associated with the application, which may have been appropriate for the first session may be inappropriate or inefficient in a later session.

Efforts to address mobility of uses in a network have included efforts to provide preference mobility such as, for example, Novell's Z.E.N.works™, Microsoft's "Zero Administration" initiative for Windows® and International Business Machines Corporation's (IBM's) Workspace On Demand™. However, these solutions each typically require pre-installation of software at the workstation to support their services. For example, Novell's Z.E.N. and IBM's Workspace On Demand utilize a vendor-supplied support layer in the operating system to enable their services. In addition to modifying the workstations operating system at startup to setup tasks to customize the user's environment, the Microsoft Zero Administration solution may be limited to a homogeneous environment where the workstation and the server are utilizing the same operating system.

Each of these "mobility" systems typically do not address the full range of complications which may arise in a heterogeneous network utilizing differing devices and connections. Users would typically have to manually define session characteristics at each differing workstation they used in the network or maintain local characteristic definitions which may be inappropriate for particular applications a user is executing and may substantially reduce the administrative convenience of a centrally controlled network. Thus, these various approaches fail to provide a seamless integration of session characteristics across heterogeneous network devices. Such solutions may reduce network administration only after initial installation on each workstation. Furthermore, content is typically not addressed such that inefficiencies in use of the network may result.

SUMMARY OF THE INVENTION

Accordingly, it is an object of the present invention to provide methods, systems and computer program products for management of user sessions in a network environment.

It is a further object of the present invention to provide such methods, systems and computer program products which do not require pre-installation of software at the workstations.

It is a further object of the present invention to provide such methods, systems and computer program products that can automatically accommodate various types of hardware operating under different operating systems.

These and other objects are provided, according to the present invention, by controlling a user session in a network by defining rules for controlling user sessions based on characteristics of an operating environment, determining the characteristics of an instance of an operating environment associated with a user session in the network and applying the defined rules to the determined characteristics to control the user session based on the characteristics of the instance of the operating environment. In particular, the type of network connection, the type of device connected to the network, the user identification of the user and/or the identification of an application executed by the user may be determined and the session controlled based on this determination. Preferably, the rules control the content of communications provided during the user session based on the characteristics of the operating environment.

By controlling the user sessions based on rules, content provided to the user may be customized for the session. Thus, the user's session may be optimized for the instance of the operating environment of the user by leveraging information of the instance to provide session specific content to the user. Accordingly, network efficiency or device performance may be improved by not utilizing network bandwidth or system resources to handle information which is not needed by the user. Similarly, group consistency and mobility of the user in the network may be improved as the content provided to the user, including such things as characteristics of a network connection, characteristics of content associated with a device utilized by the user and preferences associated with an application utilized by a user, may be modified based on the specific characteristics of an instance of the operating environment of the user.

In particular embodiments of the present invention, the rules may also control access to applications or the network based on the characteristics of an operating environment.

In another embodiment of the present invention, the defined rules are stored on a network accessible server. The defined rules are then obtained from the network accessible server in response to the determination of characteristics of an instance of an operating environment associated with a user session in the network. Preferably, the network accessible server is an on-demand server.

In a further embodiment of the present invention, content provided to a device of a user of a network is controlled by providing session dependent information to a network device having stored policies which are based on the session dependent information. The content provided by the network device to a device associated with the user is then automatically modified based on the policies and the provided session dependent information.

In particular, the session dependent content may include automatically translating content of a communication provided to the device associated with the user from a first language to a second language. The session dependent information may include the type of network connection, the type of device connected to the network, the user identification of the user and an identification of an application executed by the user.

While the invention has been described above primarily with respect to the method aspects of the invention, both systems and computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
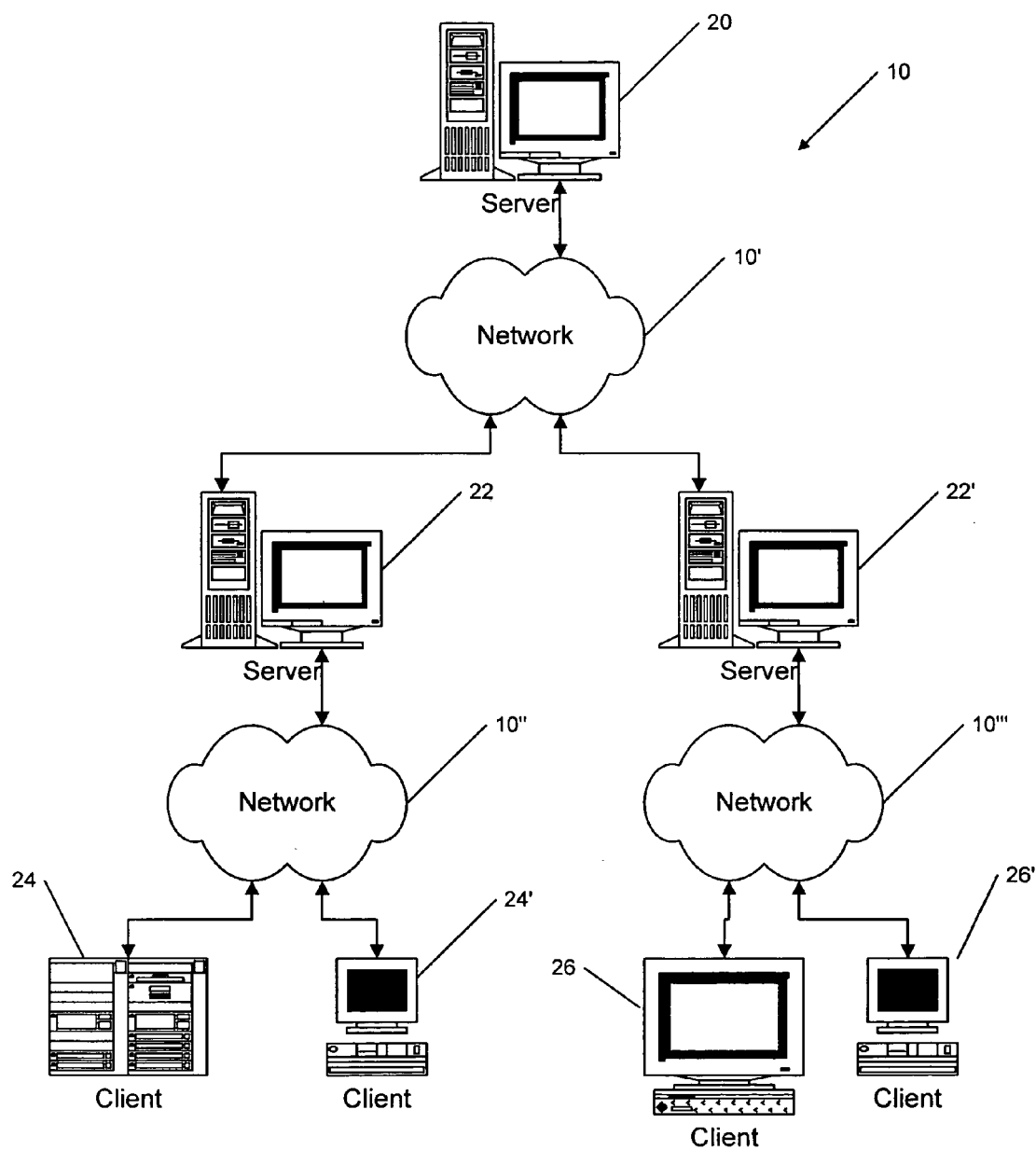
FIG. 1 is a schematic diagram of a computer network suitable for use with the present invention.

FIG. 1 illustrates an embodiment of a computer network suitable for use with the present invention. Computer network system 10 includes a server 20 such as a Tivoli™ server and on-demand servers 22, 22'. System 10 further includes client stations 24, 24', 26, 26'. As illustrated, on-demand servers 22, 22' are connected to server 20 over a first network segment 10'. Client stations 24, 24' are served by on-demand server 22 and communicate over network 10". Similarly, clients 26, 26' are served by server 22' and communicate over network 10'". As schematically illustrated in FIG. 1, client stations 24, 24', 26, 26' may be hardware from a variety of vendors operating a variety of different operating systems. However, in a preferred embodiment, each of the client stations 24, 24', 26 and 26' are capable of executing a Java™ (Sun Microsystems, Inc.) enabled web browser.

System 10, as illustrated in FIG. 1, is a centrally managed computer network with server 20 acting as the central administration station executing network management software such as TME 10™ from Tivoli Systems, Inc. Servers 22, 22' act as on-demand servers for their respective associated client stations 24, 24', 26, 26' and provide for client/server application support. It is further to be understood that networks 10', 10", 10'" may be separate physical networks, separate partitions of a single physical network or may be a single network. Furthermore, server 20 may be configured to allow for direct communication between server 20 and clients 24, 24', 26, 26'.

As will be described further herein with reference to FIG. 2, server 20, server 22 and/or server 22' may have stored on them or have access to a repository of rules or policies and preferences or data associated with the rules or policies so as to manage sessions with clients 24, 24', 26 and 26'. Thus, for example, server 20 could maintain the repository of policies and associated data which could then be accessed by on-demand servers 22 and 22'. Alternatively, a copy of the repository could be maintained at all or a portion of the servers.

Preferably, on-demand servers 22, 22' are configured to operate within the eNetwork™ environment available from International Business Machines Corporation. Preferably the present invention is utilized in an On-Demand Server™ (IBM) system such as that described in commonly assigned and concurrently filed U.S. patent application Ser. No. 09/211,528, entitled METHODS, SYSTEMS AND COMPUTER PROGRAM PRODUCTS FOR CENTRALIZED MANAGEMENT OF APPLICATION PROGRAMS ON A NETWORK, and U.S. patent application Ser. No. 09/211,529, entitled METHODS, SYSTEMS AND COMPUTER PROGRAM PRODUCTS FOR MANAGEMENT OF CONFIGURABLE APPLICATION PROGRAMS ON A NETWORK, the disclosures of which are hereby incorporated by reference as if set forth fully herein. Similarly, the present invention may be utilized with a local application preference system such as that described in concurrently filed and commonly assigned U.S. patent application Ser. No. 09/211,675, entitled METHODS, SYSTEMS AND COMPUTER PROGRAM PRODUCTS FOR MANAGEMENT OF PREFERENCES IN A HETEROGENEOUS COMPUTING ENVIRONMENT, the disclosure of which is hereby incorporated by reference as if set forth fully herein. However, while the present invention may be implemented in this environment, it is also suitable for use with other client/server and network management environments.

As is described in more detail below, the present invention allows for control of a session based on policies and information about the session. Thus, for example, the present invention may control characteristics of communications over a network connection, characteristics of an application, access to applications, or other session content based on information about the instance of the operating environment of the session. As used herein, the term session refers to a period of time where the operating environment of a remote processor connected to a network is not expected to change. Thus, for example, if the policies controlling a session relate to the network connection of the session and the type of hardware device connected to the session, then the session may be considered to start with connection to the network and end with disconnect. Similarly, if the control of the session utilizes policies further based on the user identification of a user logged on to the network, then the session may be considered to start when the user logs on and end when the user logs off. In an even finer granularity, if the policies controlling the session further control characteristics of an application, then the session may be considered to start when the application is invoked and end when the application is terminated. Thus, as can be seen from the above discussion, the concept of a session may vary depending on the particular policies or rules utilized and, further, multiple sessions may concurrently occur if multiple policies control differing aspects of user activity with respect to the network.

The present invention utilizes policies or rules to control a session by controlling the content and/or characteristics of the session based on information about the session. The types of information typically utilized to control a session will include the type of network connection (e.g. ethernet, modem, modem speed, duration of connection, etc), the type of device connected (e.g. desktop system, graphics workstation, laptop computer, personal data assistant (PDA), operating system, display type, etc), the application being executed or requested and the user identification of the user. Collectively, this information makes up the operating environment of a user session. Based on all or part of the information about a user's operating environment, a centrally administered set of rules may be applied to customize the content provided to the user for the operating environment.

As an example, a user may use client 24' to connect to server 22 and execute a graphics program over network 10". Client 24' may be a graphics workstation with a display resolution of 1280×1024 and be connected to the network over a 100 MB ethernet adapter. When the user connects and requests the graphics application, the centrally administered rules would be applied to the request to customize the content provided for the particular operating environment. Thus, data may be provided to the client 24' in an uncompressed format and the information may be provided with 24 bit color and window locations and sizes and font sizes and the like set to accommodate the 1280×1024 display. When the user moves to client 26' which is a remote personal computer having an 800×600 display and using a modem to connect to network 10''' this information would then be used by the centrally administered rules to control the content provided to client 26'.

For example, if client 26' was incapable of running the graphics program, then the user's request for the program could be denied. Furthermore, if program execution was allowed, then the data provided over the lower speed modem connection could be compressed to increase performance. The window sizes and locations could also be modified to assure that the windows would be displayed on the lower resolution display. Thus, the content provided to the user would be modified using predefined rules and based on information about the operating environment of a user's session.

In such a way, mobility within a heterogeneous network may be facilitated in that the control of content may be performed without user intervention based on the use of the centrally administered rules. As will be appreciated by those of skill in the art in light of the present disclosure, such a system may be utilized in any number of ways to control the characteristics of a session based on operating environment information. For example, to control network traffic to assure fairness, to prioritize content based on application priorities (e.g. provide content for higher priority applications before content for lower priority applications), to assure compliance with administrative directives, for license authentication, to provide user preferences to users as they move from client to client, or combinations of each of these examples. As described below, the present invention may be particularly well suited to, for example, control language translation.

Operations of the present invention will now be described with respect to the flowcharts of FIG. 2 through FIG. 4. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
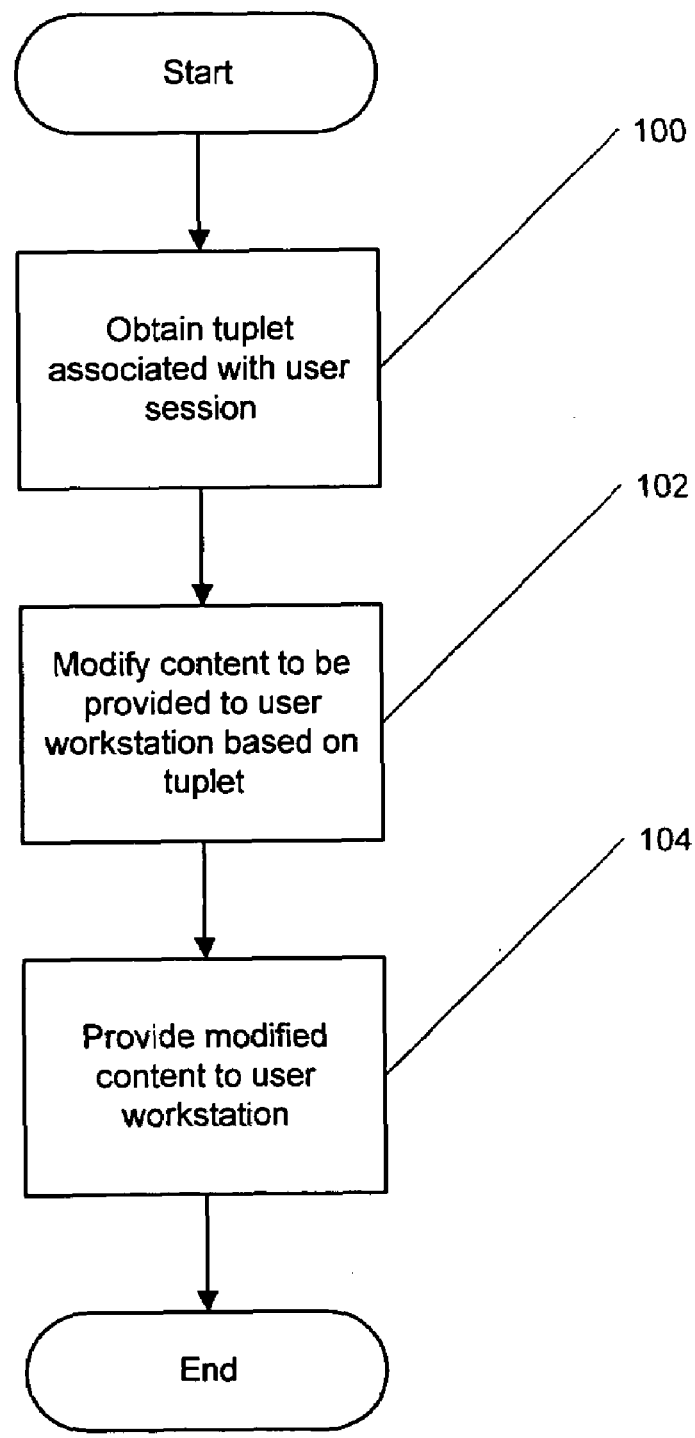
FIG. 2 is a flowchart illustrating operations of a policy based session management system according to an embodiment of the present invention.

Referring now to the flowchart of FIG. 2, operations for policy based management of session content are illustrated. As seen in FIG. 2, a central policy server, such as servers 20, 22 or 22', receives a tuplet of operating environment information associated with a session on a workstation 24, 24', 26 or 26' (block 100). Such a tuplet preferably includes {connection type; connected device; userid; application}. The level of detail in the information provided to the central policy server may vary depending on the policies or rules implemented. For example, if rules are based on a display resolution, then the information provided should include some information about the display. However, such information may be implicitly provided, for example, by categorizing devices based on common capabilities and then providing a device category to the central policy server. Furthermore, the information may be obtained or provided to the central policy server from a number of sources including the workstation, network devices connected to the workstation, servers associated with communications to or from the workstation or other sources. Thus, the information may be accumulated by the central policy server from various sources or may be received directly from the workstation itself.

The central policy server then uses the information in the tuplet to modify the content to be provided to the user (block 102) and the modified content is provided to the user (block 104). As described above, such modification of content may take many forms, including, but not limited to, compressing data for network transmission, removing color components for monochrome displays, providing text only for lower speed connections or text displays, prioritizing communications, varying preferences or setup options based on device characteristics, userids or the like. Furthermore, as the control of content is rules based, the content may be modified based on combinations of information about the instance of the operating environment associated with a session.

Figure 3:
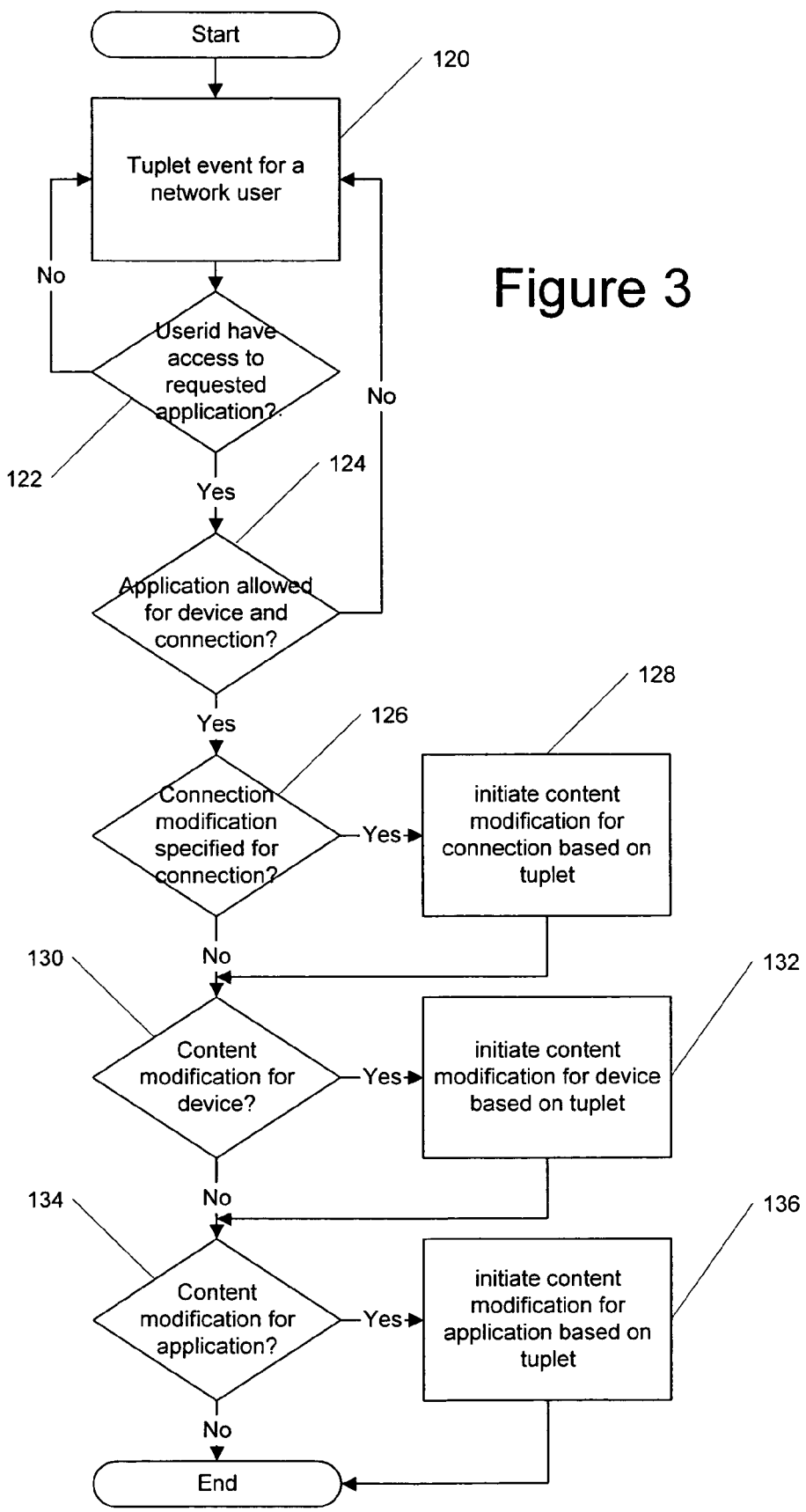
FIG. 3 is a flowchart illustrating operations of a particular embodiment of the policy based session managements system.

FIG. 3 illustrates a particular example of a policy based system according to the present invention. As seen in FIG. 3, a tuplet associated with the network user (block 120) becomes available for processing and it is determined from the userid and application specified by the tuplet if the userid has access rights to the requested application (block 122). If the userid does not have access rights, then the request to execute the application is rejected and the server waits for the next tuplet event to process (i.e. receipt of a tuplet or obtaining of a tuplet).

If the userid does have access rights, then it is determined if the network connection and device portions of the tuplet specify a device and a connection which allow execution to the application (block 124). If not, then the request to execute the application is rejected. If the request is accepted, then it may be determined if the connection specified by the tuplet would benefit from modification of the content (block 126), for example, by compression of the data transmitted over a low speed connection. If content modification for the connection is selected based on the tuplet, then content modification may be initiated for the connection (block 128). As described above, the type of content modification may vary from connection to connection. Other examples of content modification based on connection characteristics include removal of material such as graphics or text or the prioritization of material such as text.

Irrespective of content modification based on the connection portion of the tuplet, it is also determined if content modification is appropriate based on the device portion of the tuplet (block 130). If application of the rules determines that content modification for the specified device characteristics is appropriate, then the content modification for the device is initiated (block 132). Such content modification may include any number of modifications, including modification of graphic information to provide monochrome information to monochrome monitors, modification of information based on operating system characteristics, display size, memory capacity, hard drive space, processing speed or other device dependent operating environment characteristics. For example, if it is determined that a system only supports 16 colors, then the content may be modified to reduce the color information from, for example, 24 bit color to 16 colors.

As is further seen in FIG. 3, it may also be determined if content modification is appropriate based on the application which is to be performed (block 134). If so, then the content modification for the application may be initiated (block 136). For example, application specific content modification may include modifying web pages provided to a web browser application to account for the type of browser or in combination with the userid or other information, to translate the content into another language. Furthermore, applications such as data base applications or other applications requiring high network bandwidth may cause the content to be modified to compress the data before transmission over the network. Other examples of modification of the content based on the application may include restructuring content to provide a simplified user interface.

While the example of FIG. 3 illustrates modification based on a single characteristics and combinations of characteristics, as will be appreciated by those of skill in the art, modification may be based on any combination of characteristics provided to the central policy server.

Figure 4:
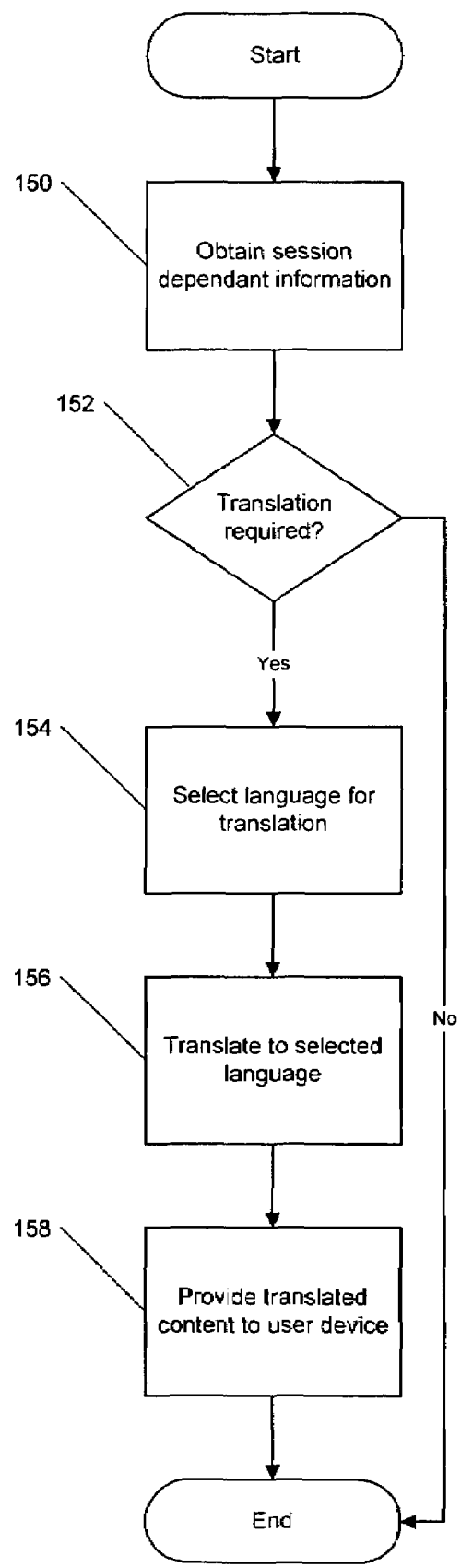
FIG. 4 is a flowchart of a particular embodiment of the present invention where the policy based session management system provides automatic language translation of session content.

FIG. 4 illustrates a specific example of a language translator according to the present invention. Such a language translator may be utilized, for example, at a theme park or other venue where visitors who speak differing languages would utilize a pervasive computing device such as a PDA which communicates with a central server to obtain information about the park. As seen in FIG. 4, session dependent information is obtained from the client device (block 150) and a determination made based on the session dependent information if translation of content provided to the client is required (block 152). For example, each different type of device in the theme park setting could translate to a different language. When a user activates the device, the device characteristics are provided to a common server which, based on the device, translates the content provided to the device to differing languages. This translation may be dynamic or may be by selecting content in the appropriate language from pre-translated sources. Alternatively, in a web browser setting, the "language" setting of the operating system associated with a user session could be provided to the server and used to automatically modify content provided to the user's web browser to translate the content to the specified language.

If language translation of the content is required then the language for translation is selected based on the session dependent information (block 154) and the content translated to the selected language (block 156). The translated content may then be provided to the client device (block 158). Thus, the selection of whether to translate content to a different language and the translation language may be established without user intervention based on session dependent information such as user preferences, device types or the like.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling content provided to a device of a user of a network, the method comprising:
providing session dependent information associated with the device to a network device having stored policies which are based on the session dependent information; and
wherein the step of automatically modifying content is selected from the group consisting of removing color components of the content, removing graphics information to provide text-only content, prioritizing communications and varying preferences for an application.

2. A method according to claim 1, wherein the session dependent information comprises at least one of a type of network connection, a type of device connected to the network, a user identification of the user and an identification of an application executed by the user.

3. A method according to claim 1, further comprising the steps of:
storing the policies on a second network accessible device; and
obtaining the policies from the second network accessible device in response to the network device being provided the session dependent information.

4. A method according to claim 3, wherein the second network accessible device is an on-demand server.

5. A method according to claim 1, further comprising automatically translating content of a communication provided to the device associated with the user from a first language to a second language based on the session dependent information and the stored policies.

6. A method according to claim 5, wherein the session dependent information comprises at least one of a type of network connection, a type of device connected to the network, a user identification of the user and an identification of an application executed by the user.

7. A method according to claim 1, wherein the policies comprise policies which control at least one of characteristics of a network connection, characteristics of content associated with a device utilized by the user, and preferences associated with an application utilized by a user.

8. A method according to claim 7, wherein the content controlled by the policies is controlled based on at least one of a type of network connection, a type of device connected to the network, a user identification of the user and an identification of an application executed by the user.

9. A system for controlling content provided to a device of a user of a network, comprising:
means for providing session dependent information associated with the device to a network device having stored policies which are based on the session dependent information; and
means for automatically modifying the content provided by the network device to the device based on the policies and the provided session dependent information so as to modify the content provided to the user of the device; and
wherein the content modification is selected from the group consisting of removing color components of the content, removing graphics information to provide text-only content, prioritizing communications and varying preferences for an application.

10. A system according to claim 9, wherein the session dependent information comprises at least one of a type of network connection, a type of device connected to the network, a user identification of the user and an identification of an application executed by the user.

11. A system according to claim 9, further comprising:
means for storing the defined rules on a second network accessible device; and
means for obtaining the defined rules from the second network accessible device in response to the network device being provided the session dependent information.

12. A system according to claim 11, wherein the second network accessible device is an on-demand server.

13. A system according to claim 9, further comprising means for automatically translating content of a communication provided to the device associated with the user from a first language to a second language based on the session dependent information and the stored policies.

14. A system according to claim 13, wherein the session dependent information comprises at least one of a type of network connection, a type of device connected to the network, a user identification of the user and an identification of an application executed by the user.

15. A system according to claim 9, wherein the policies comprise policies which control at least one of characteristics of a network connection, characteristics of content associated with a device utilized by the user, and preferences associated with an application utilized by a user.

16. A system according to claim 15, wherein the content controlled by the policies is controlled based on at least one of a type of network connection, a type of device connected to the network, a user identification of the user and an identification of an application executed by the user.

17. A computer program product for controlling content provided to a device of a user of a network, comprising:
a computer readable storage medium having computer readable program code means embodied in said medium, said computer readable program code means comprising:
computer readable program code means for providing session dependent information associated with the device to a network device having stored policies which are based on the session dependent information; and
computer readable program code means for automatically modifying the content provided by the network device to the device based on the policies and the provided session dependent information so as to modify the content provided to the user of the device; and
wherein the content modification is selected from the group consisting of removing color components of the content, removing graphics information to provide text-only content, prioritizing communications and varying preferences for an application.

18. A computer program product according to claim 17, wherein the session dependent information comprises at least one of a type of network connection, a type of device connected to the network, a user identification of the user and an identification of an application executed by the user.

19. A computer program product according to claim 17, further comprising:
computer readable program code which stores the defined rules on a second network accessible device; and
computer readable program code which obtains the defined rules from the second network accessible device in response to the network device being provided the session dependent information.

20. A computer program product according to claim 19, wherein the second network accessible device is an on-demand server.

21. A computer program product according to claim 17, further comprising computer readable code which automatically translates content of a communication provided to the device associated with the user from a first language to a second language based on the session dependent information and the stored policies.

22. A computer program product according to claim 21, wherein the session dependent information comprises at least one of a type of network connection, a type of device connected to the network, a user identification of the user and an identification of an application executed by the user.

23. A computer program product according to claim 17, wherein the policies comprise policies which control at least one of characteristics of a network connection, characteristics of content associated with a device utilized by the user, and preferences associated with an application utilized by a user.

24. A computer program product according to claim 23, wherein the content controlled by the policies is controlled based on at least one of a type of network connection, a type of device connected to the network, a user identification of the user and an identification of an application executed by the user.

* * * * *

UNITED STATES PATENT AND TRADEMARK OFFICE
CERTIFICATE OF CORRECTION

PATENT NO. : 6,931,446 B1
DATED : August 16, 2005
INVENTOR(S) : Cox et al.

It is certified that error appears in the above-identified patent and that said Letters Patent is hereby corrected as shown below:

<u>Column 8,</u>
Line 62, should read -- and
automatically modifying the content provided by the network device to the device based on the policies and the provided session dependent infomation so as to modify the content provided to the user of the device:
and --.

Signed and Sealed this

Seventh Day of March, 2006

JON W. DUDAS
*Director of the United States Patent and Trademark Office*